United States Patent [19]

Rhoades

[11] 3,741,568

[45] June 26, 1973

[54] CABLE SEALING APPARATUS
[75] Inventor: Vaughan W. Rhoades, Tulsa, Okla.
[73] Assignee: Cities Service Oil Company, Tulsa, Okla.
[22] Filed: June 18, 1971
[21] Appl. No.: 154,372

[52] U.S. Cl.................. 277/34.6, 166/82, 277/59
[51] Int. Cl........................ F16j 15/46, F16r 41/00
[58] Field of Search................... 277/34, 34.6, 59; 166/82, 83

[56] References Cited
UNITED STATES PATENTS
3,481,610  12/1969  Slator et al. ................. 277/34.6
2,726,883  12/1955  Taylor .......................... 277/34
2,825,589  3/1958   Richardson et al. .......... 277/34
2,035,925  3/1936   Seamark ....................... 277/34

Primary Examiner—Samuel B. Rothberg
Attorney—J. Richard Geaman

[57] ABSTRACT

Disclosed herein is apparatus to be utilized in conjunction with a wellhead assembly consisting of a steel body accomodating a Hassler type sealing sleeve. The apparatus is utilized for sealing a cable which is extended within a wellbore containing fluids under pressure and is particularly applicable to the sealing of stranded cable which conventionally is most difficult to adequately seal, generally requiring large apparatus to accomplish the seal.

8 Claims, 1 Drawing Figure

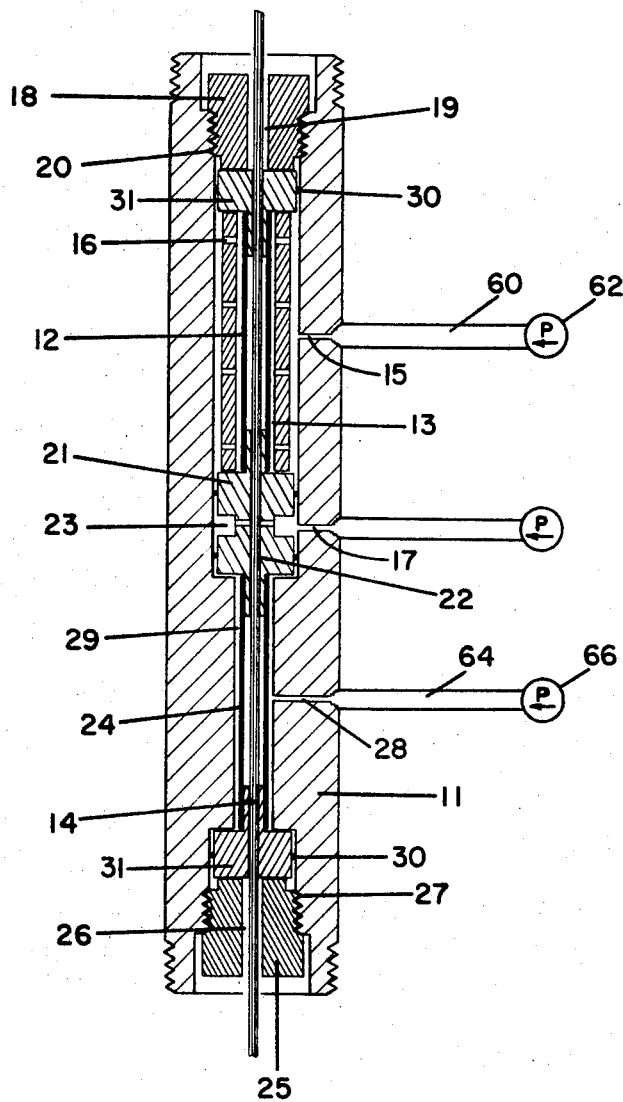
VAUGHAN W. RHOADES,
INVENTOR.
BY J Richard Gearman
ATTORNEY.

CABLE SEALING APPARATUS

BACKGROUND OF THE INVENTION

The present invention relates to apparatus for sealing cable extended within wells. More particularly, the present invention is a cable sealing apparatus particularly useful in sealing wellhead assemblies through which stranded cable is strung, for example in the testing of wells with bottomhole pressure devices.

During the bottomhole pressure testing of flowing and stagnant wells, an inherent problem is incurred in that the bottomhole testing equipment is difficult to seal at the wellhead. In conventional sealing apparatus, pressure escapes through the packing glands utilized as the sealing apparatus. This problem becomes particularly accute when stranded cable is utilized to protect bottomhole testing apparatus in extremely deep wells having corrosive environments as the pressure more readily leaks through the strands of the cable, rendering sealing of the cable a difficult procedure. Although surface transient pressure measurement has been attempted in the past, it is normally unsuccessful as there generally exists a considerable head of liquid in multiphase flowing wells, with an undeterminable amount of gas present in the well. This gas renders it nearly impossible to contain the pressure at a constant level within the wellbore as there is continual leakage of gas through the packing gland associated with the stranded wire cable of the pressure bomb. Therefore, it is necessary, especially in deep wells, to use stranded wire cable as extra strength and corrosion resistance is required for the suspension of the bottomhole test instrument in the well. Another inherent problem is that the means for sealing the stranded cable at the surface becomes particularly difficult and the surface equipment generally large in size.

The sealing equipment utilized for sealing cables, especially in the removal of stranded wire and a bottomhole instrument from a well, requires the use of a packing fluid, generally grease, which readily leaks through the stranded cable and may cause leakage into or out of the well, associating tremendous problems with the operation. The bulk of the sealing equipment utilized makes it difficult to test pumping wells as often the pump must be skidded from the wellhead in order to afford the requisite space for the packing gland assembly to be mounted at the wellhead. Therefore, what is required is apparatus for sealing cables, especially stranded cables, during the introduction of downhole instruments into a well in order to adequately seal the well from fluid leakage.

It is an object of the present invention to provide apparatus for sealing a cable introduced into a wellbore.

It is a further object of the present invention to provide a cable sealing apparatus which may be utilized with stranded wire cable.

It is still a further object of the present invention to provide a cable sealing apparatus which does not require the removal of auxiliary equipment from a wellhead for the introduction of a cable, and associated testing apparatus, into a flowing or stagnant well maintained under pressure.

With these and other objects in mind, the present invention may be more fully understood through referral to the accompanying description and drawing.

SUMMARY OF THE INVENTION

The objects of the present invention are accomplished through use of a cable sealing apparatus. The apparatus comprises a housing having a passageway therethrough of sufficient diameter to receive a cable. A flexible sleeve is positioned within the passageway of the housing and affixed to the passageway at each end having an inside diameter in excess of the outside diameter of the cable to be passed therethrough. Means are provided for applying pressure to the exterior of the flexible sleeve so as to contact the flexible sleeve upon the cable passed therethrough. The means for applying pressure to the flexible sleeve may comprise the housing having a fluid injection port connecting the annulus formed between the exterior of the flexible sleeve and the interior of the housing to the exterior of the housing. Also provided may be means for injecting fluid under varying pressure into the injection port. In general, the means for injecting fluid under varying pressure into the injection port comprise a pressure line, one end of which is connected to the fluid injection port at the exterior of the housing with a pressure pump connected to the opposite end of the pressure line. A spacer sleeve may be positioned between the flexible sleeve and the interior of the housing in order to vary the size of the sleeve for varying cable diameters.

The cable sealing apparatus may further comprise means for introducing a viscous fluid into the housing passageway below the flexible sleeve to act as a lubricant in passing the cable through the sleeve. The means for introducing a viscous fluid may comprise the housing having a viscous fluid injection port, below the flexible sleeve, connecting the housing passageway with the exterior of the housing in conjunction with means for injecting viscous fluid into the viscous fluid injection port. The means for injecting viscous fluid may comprise a viscous fluid injection line, one end of which is connected to the viscous fluid injection port and in conjunction, a viscous fluid pump connected to the opposite end of the viscous fluid injection line.

The flexible sleeve may be fixed to the passageway at the upper portion of the housing and above the viscous fluid injection port by the apparatus further comprising a first removal plug having a hole reamed therein with a diameter greater than that of the cable, but less than that of the flexible sleeve, threadably connected to the interior of the upper portion of the housing and bearing upon the flexible sleeve and spacer sleeve. The lower end of the flexible sleeve may be affixed to the passageway through use of a viscous fluid injection block having a hole reamed therein of a diameter greater than that of the cable, but less than that of the flexible sleeve, slottably mounted within the housing and abutting with the flexible sleeve and spacer sleeve. The viscous fluid injection block further comprises an injection hole reamed therein connecting the viscous fluid injection port with the passageway.

BRIEF DESCRIPTION OF THE DRAWING

The present invention may be more fully understood by referral to the accompanying Drawing in which one embodiment of the present invention is disclosed, having a first and second flexible sleeve contained in the housing in conjunction with means for introducing a viscous fluid in the housing, and having all portions thereof removeable therefrom the housing.

DETAILED DESCRIPTION OF THE INVENTION

The present invention is most adequately described by referral to the accompanying FIG. illustrating a well assembly consisting of a housing 11 having a first flexible sleeve 12 contained in a passageway 13, reamed within the interior portion of the housing 11. The flexible sleeve has an inside diameter greater than the outside diameter of a cable 14 passing through the housing 11 and first flexible sleeve 12. The means for applying pressure upon the exterior of the flexible sleeve 12 are provided so that the sleeve 12 may be contracted upon the cable 14 in order to give rigid support thereto and not allow pressure bleed therethrough. Means for applying pressure to the exterior of the flexible sleeve 12 may comprise, for example the housing 11 having a fluid injection port 15 positioned between the exterior of the flexible sleeve 12 and the interior of the housing 11, and the exterior of the housing 11. Also provided are means for injecting fluid under varying pressure into the injection port 15. These means may comprise a pressure line 60 one end of which is connected to the fluid injection port 15 at the exterior of the housing and a fluid pressure pump 62 connected to the opposite end of the pressure line. The cable sealing apparatus depicted in the FIG. also comprises a spacer sleeve 16 positioned between the flexible sleeve 12 and the interior of the housing 11. Means for introducing a viscous fluid into the housing passageway 13 comprises a viscous fluid injection port 17 connecting the housing passageway 13 with the exterior of the housing 11 and means for injecting viscous fluid into the viscous fluid injection ports 17 are provided. The means may comprise, for example, a viscous fluid injection line, not shown on the accompanying Figure, one end of which is connected to the viscous fluid injection port 17 and a viscous fluid pump, also deleted from the Figure, connected to the opposite end of the viscous fluid injection line. The flexible sleeve 12 is affixed to the housing passageway 13 at the upper portion of the housing 11, above the viscous fluid injection port 17, by a first removeable plug 18 having a hole 19 reamed therein, the hole 19 having a diameter greater than that of the cable to be passed therethrough, but less than that of the flexible sleeve 12. The first removeable plug 18 is threadably connected to the interior of the upper portion of the housing 20 so as to bear upon the flexible sleeve 12 and spacer sleeve 16. The lower portion of the first flexible sleeve 12 is held intact by a viscous fluid injection block 21 having a hole 22 reamed therein, the hole 22 having a diameter greater than that of the cable 14, but less than that of the flexible sleeve 12, slottably mounted within the housing 11 and abutting with the flexible sleeve 12 and spacer sleeve 16. The viscous fluid injection block 21 has as injection hole 23 therein, connecting the viscous fluid injection port 17 with the housing passageway 13.

The cable sealing apparatus of the present invention as depicted in the accompanying Figure has a further preferred embodiment comprising a second flexible sleeve 24. The second flexible sleeve 24 is positioned within the housing passageway 13 below the viscous fluid injection port 17 being affixed to the interior of the housing 11 at its upper end by the viscous fluid injection block 21 and at its lower end by a second removeable plug 25. The second removeable plug 25 has a hole 26 reamed therein with a diameter greater than that of the cable 14, but less than that of the second flexible sleeve 24, and is threadably connected to the interior of the lower portion of the housing 27. When the second removeable plug 25 is so positioned, it bears upon the second flexible sleeve 24 and holds it rigidly in place. Means are provided for applying pressure to the exterior of the second flexible sleeve 24 so as to contract the second flexible sleeve 24 upon the cable 14 passing therethrough. The means for applying pressure to the second flexible sleeve 24 may comprise the housing 11 having a second fluid injection port 28 which connects the annulus 29, formed between the exterior of the second flexible sleeve 24 and the interior of the housing 11, to the exterior of the housing 11 in conjunction with means for injecting fluid under varying pressure into the second fluid injection port 28. Pressure seal member 31 having O-ring seal 30 seating thereon and between exterior housing 11 separates removable plugs 25 and 19 from flexible sleeves 24 and 12, respectively. Various and sundry means may be provided for injecting fluid under varying pressure into the second fluid injection port 28. The means may comprise a second pressure line 64 one end of which is connected to the second fluid injection port 28 at the exterior of the housing 11, and a second fluid pressure pump 66 connected to the first pressure line in order to utilize a common pressure pump for introduction of fluid into the first flexible sleeve 12 and second flexible sleeve 24, so as to contact the sleeves against the cable 14 contained therein the housing passageway 13. Another embodiment of the invention is to utilize only one pump, for example pump 62, vice pump 66 and instead of connecting line 64 to pump 66 this line may be connected to line 60 thereby utilizing only pump 62.

As depicted on the Figure, the two Hassler type sealing sleeves which represent the first and second flexible sleeves, are utilized for contraction against the cable in order to prevent leakage of fluid therefrom the wellbore. As depicted in the Figure, the spacer sleeve may be replaced within the housing passageway by removing the first removeable plug therefrom the housing and inserting a larger or smaller inside diameter space sleeve in accordance with the cable size to be utilized. Generally, these sleeves will be made of steel to yield rigidity and firmly hold the flexible sleeve in position. The viscous fluid injection mechanism generally is a grease lubricator positioned in the central portion of the housing in order to apply grease or another suitable lubricant to the cable to yield a longer life to the flexible sleeves utilized. The lower flexible sleeve, or Hassler sleeve, is provided in the sealing apparatus to further seal and hold the cable during introduction into the wellbore. The particular advantage of utilizing the stranded cable sealing apparatus depicted in the Figure is that the apparatus allows a constant pressure to be placed upon the flexible tubing or sleeve which, in turn, fits the flexible sleeve contained within the housing to the stranded cable so that fluid leakage through the stranded cable is prevented. The second sleeve is particularly helpful in the introduction of the stranded cable into the well, whereas the first flexible sleeve and lubricator are particularly applicable in pulling the stranded cable from the well.

The viscous fluid injection system is utilized as a means for lubricating the cable as it is pulled through the flexible tubing portion or Hassler sleeve provided and also provides an excellent sealing mechanism when a stranded cable utilized as the lubricant fills the interstices between the wire strands of the cable and thereby prevents lubricant and fluid movement therebetween. Through the operation of the apparatus of the present invention, one is afforded the flexibility of removing various size stranded cables through the assembly. The pressure may be varied through the fluid injection ports, either by automatic control or pneumatically by manual control. The pressure exerted upon the flexible sleeves is adjustable by sizing of the steel spacer sleeve utilized with the upper or first flexible sleeve. Through spacer sleeve selection, one may pass various size cables with various size mesh strands contained therein through the apparatus to provide adequate control of introduction or withdrawal of the cable from the well. The apparatus utilized in this procedure provides a substantial pressure barrier to prevent fluid leakage from the wellbore.

Therefore, the present invention affords a means for sealing stranded or standard cable at the surface through simplified wellbore apparatus. The apparatus is comprised of replaceable parts which do not require a large amount of space for assembly and may be utilized in conjunction with conventional wellbore equipment without necessitating removal thereof. The apparatus may be comprised of conventional materials which will give long life and corrosion resistance, depending on the varied use and design. The apparatus then provides means for entrance and withdrawal of stranded wire of bottomhole instruments from a well while alleviating the normal problems of such operations.

While the invention has been described above with respect to certain embodiments thereof, it will be understood by those skilled in the art that various changes and modifications may be made without departing from the spirit and scope of the invention as set forth herein.

Therefore, I claim:

1. A wellbore cable sealing apparatus which comprises a housing having a passage therethrough of sufficient diameter to receive a cable; a first flexible sleeve affixed to the passageway at the upper portion of the housing and having an inside diameter in excess of the outside diameter of the cable to be passed therethrough; a second flexible sleeve affixed to the passageway at the lower portion of the housing and having an inside diameter in excess of the outside diameter of the cable to be passed therethrough; a first fluid injection port in said housing connecting the annulus formed between the exterior of the first flexible sleeve and the interior of the housing to the exterior of the housing; a second fluid injection port in said housing connecting the annulus formed between the exterior of the second flexible sleeve and the interior of the housing to the exterior of the housing; a spacer sleeve positioned between the first flexible sleeve and the interior of the housing; a housing passageway situated between said spacer sleeve and said first flexible sleeve; a viscous fluid injection port connecting said first housing passageway with the exterior of the housing; a first removable plug having a hole reamed therein with a diameter greater than that of the cable, but less than that of the first flexible sleeve, connected to the interior of the upper portion of the housing and bearing upon the first flexible sleeve and spacer sleeve; and a viscous fluid injection block having a hole reamed therein with a diameter greater than that of the cable, but less than that of the first flexible sleeve, said block being slideably mounted within the housing and abutting with the flexible sleeve and spacer sleeve and having an injection hole therein connecting the viscous fluid injection port with the passageway in the injection block.

2. The cable sealing apparatus of claim 1 additionally including a first pressure line, one end of which is connected to the first fluid injection port at the exterior of the housing and a first fluid pressure pump, connected to the opposite end of the first pressure line.

3. The cable sealing apparatus of claim 2 additionally including a first viscous fluid injection line, one end of which is connected to the viscous fluid injection port, and a viscous fluid pump connected to the opposite end of the viscous fluid injection line.

4. The cable sealing apparatus of claim 1, additionally including means for injecting viscous fluid into the viscous fluid injection port.

5. The apparatus of claim 1 further comprising:
   a. a second flexible sleeve positioned within the passageway below the viscous fluid injection port being affixed to the interior of the housing at its upper end by the viscous fluid injection block;
   b. a second removable plug having a hole reamed therein with a diameter greater than that of the cable, but less than that of the second flexible sleeve, threadably connected to the interior of the lower portion of the housing and bearing upon the second flexible sleeve; and
   c. means for applying pressure to the exterior of the second flexible sleeve so as to contact the second flexible sleeve upon the cable passed therethrough.

6. The cable sealing apparatus of claim 1 wherein the means for applying pressure to the exterior of the second flexible sleeve comprise:
   a. the housing having a second fluid injection port connecting the annulus formed between the exterior of the second flexible sleeve and the interior of the housing, to the exterior of the housing; and
   b. means for injection fluid under varying pressure into the second fluid injection port.

7. The cable sealing apparatus of claim 1 wherein the means for injecting fluid under varying pressure into the second fluid injection port comprise:
   a. a second pressure line, one end of which is connected to the second fluid injection port at the exterior of the housing; and
   b. a second fluid pressure pump, connected to the opposite end of the second pressure line.

8. The cable sealing apparatus of claim 1 wherein the means for injecting fluid under varying pressure into the second fluid injection port comprise a second pressure line, one end of which is connected to the second fluid injection port at the exterior of the housing and the opposite end of which is connected to the first pressure line.

* * * * *